United States Patent
Homer, III (12)

(10) Patent No.: US 6,273,665 B1
(45) Date of Patent: Aug. 14, 2001

(54) DIVERGENT INLET FOR BULK MATERIAL FEEDER

(75) Inventor: John C. Homer, III, Geauga, OH (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/309,090

(22) Filed: May 10, 1999

(51) Int. Cl.⁷ .................................................. B65G 37/00
(52) U.S. Cl. .................... 414/327; 198/544; 198/525; 414/21; 414/397; 177/119; 73/1.13; 222/415; 138/120; 193/2 A
(58) Field of Search .................. 414/327, 325, 414/287, 288, 326, 397, 21; 198/525, 544; 193/2 A, 29, 30; 73/1.13; 177/119, 16; 138/120; 222/415

(56) References Cited

U.S. PATENT DOCUMENTS

| | | |
|---|---|---|
| 1,059,005 | 4/1913 | Schaffer . |
| 1,909,536 | 5/1933 | Hoke . |
| 2,610,726 | 9/1952 | Howard . |
| 2,988,202 | 6/1961 | Pampel et al. . |
| 3,701,409 | 10/1972 | Gagnon et al. . |
| 3,756,375 | 9/1973 | Briggs . |
| 3,814,270 | 6/1974 | Murphy . |
| 4,257,518 | * 3/1981 | Stock et al. .................... 98/603 X |
| 4,838,750 | 6/1989 | Finch . |
| 5,048,669 | 9/1991 | Swinderman . |
| 5,620,085 | 4/1997 | Cadou et al. . |
| 5,686,653 | 11/1997 | Homer, III et al. . |
| 5,747,747 | 5/1998 | Cadou et al. . |
| 5,755,318 | 5/1998 | Zikeli et al. . |

FOREIGN PATENT DOCUMENTS

| | | | |
|---|---|---|---|
| 0658442 | * 11/1986 | (CH) | ........................................ 406/30 |
| 3325426 | * 1/1985 | (DE) | ........................................ 193/30 |
| 336581 | * 10/1930 | (GB) | ...................................... 198/525 |
| 874222 | * 8/1961 | (GB) | ........................................ 193/29 |

OTHER PUBLICATIONS

Stock Equipment Company Brochure No. 762, entitled "Stock Gravimetric Feeders with Microprocessor Controls" (1996).

* cited by examiner

Primary Examiner—Frank E. Werner
(74) Attorney, Agent, or Firm—Pepper Hamilton LLP

(57) ABSTRACT

A bulk material feeder is disclosed for improving material flow as the material makes the generally ninety degree (90°) transition from the downcomer to the generally horizontal conveyor. The downcomer presents an innermost divergent surface that extends upwardly from the discharge opening of the downcomer. The divergent surface may be defined by an inlet wall that is fit within the outer casing wall of the downcomer, or by the outer casing wall itself. The present invention also concerns the method of retrofitting an existing feeder with a divergent inlet.

11 Claims, 2 Drawing Sheets

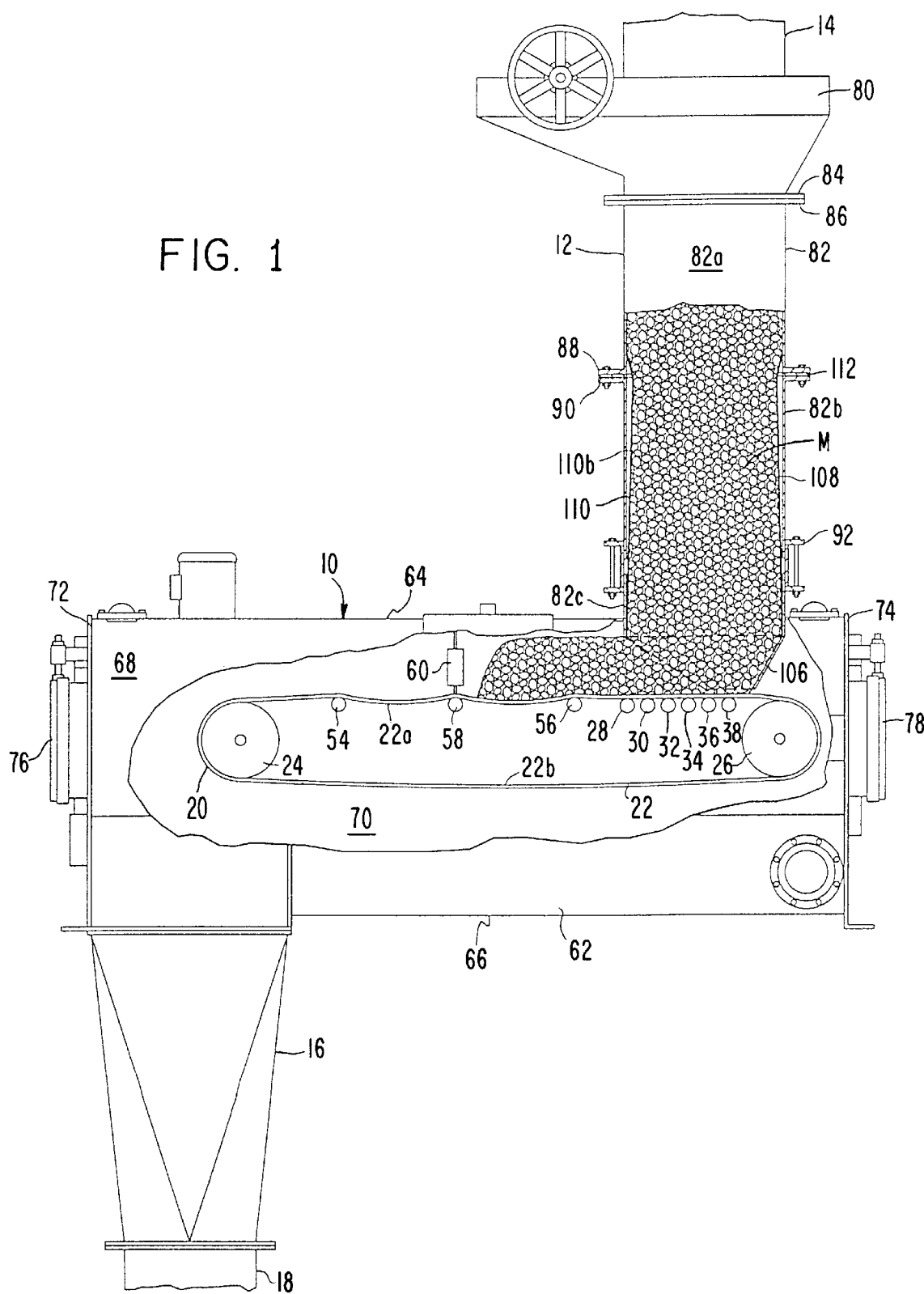

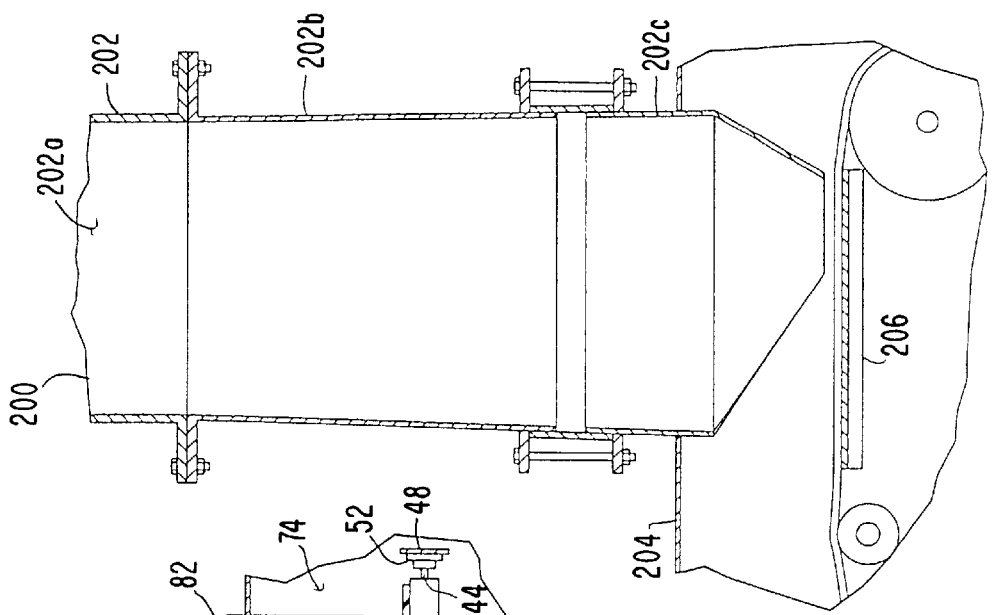
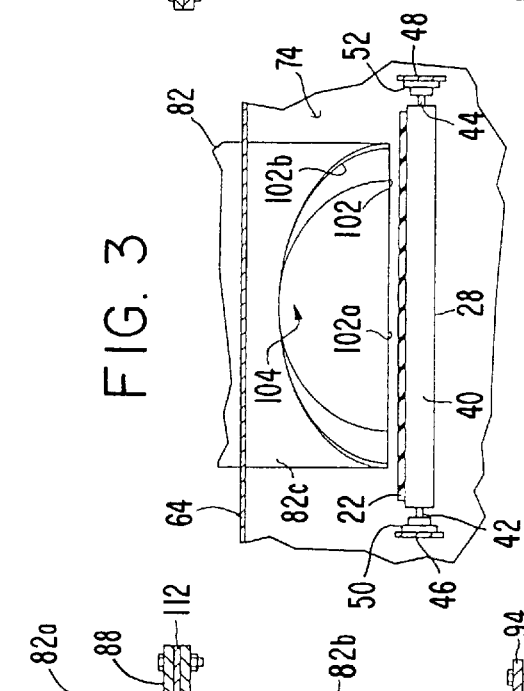
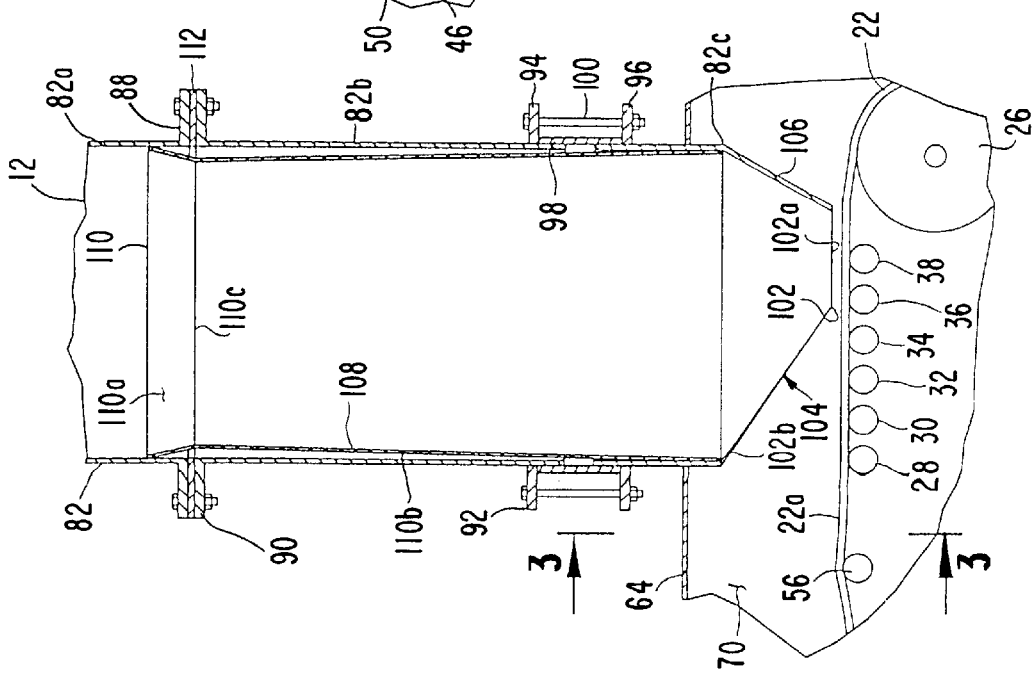

डI VERGENT INLET FOR BULK MATERIAL
FEEDER

RELATED APPLICATIONS

Not Applicable

FEDERALLY SPONSORED RESEARCH OR
DEVELOPMENT

Not Applicable

MICROFICHE APPENDIX

Not Applicable

BACKGROUND OF THE INVENTION

1. Field of the Invention

The present invention relates generally to bulk material feeders and, more particularly, to a divergent inlet that improves material flow from the supply downcomer to the horizontal conveyor of the feeder.

2. Discussion of Prior Art

Those ordinarily skilled in the art will appreciate that numerous processes involve conveying a mass or masses of solid particulate material (alternatively referred to as bulk material) along a path from one location to another. Moreover, the material flow path will often involve a transition from generally downward flow to substantially horizontal flow. For example, bulk material will commonly pass through a downcomer to a substantially horizontal conveyor, whereby the material is directed downwardly through the downcomer to the conveyor and then carried horizontally away from the downcomer by the conveyor. Such an arrangement is often designed to move the material along the path or, in some instances, control the volume-rate or mass-rate of flow of material along the path. In addition, the downcomer and horizontal conveyor are often collectively referred to as a bulk material feeder.

In any case, there are often problems associated with material flow through a bulk material feeder. For example, the material is often not transferred to the conveyor at a uniform rate, even though there is a consistent rate of material being supplied to the downcomer. This problem has been particularly identified with respect to a certain type of bulk material feeder known as a gravimetric feeder. The gravimetric feeder includes a variable speed conveyor which may be designed to change speed in response to the amount of material being carried by the conveyor. In this respect, the conveyor speed may be increased or decreased to ensure that the desired amount of material is being moved by the conveyor. Manifestly, if the material is being unevenly transferred from the downcomer to the conveyor, the conveyor speed will necessarily have to adjust to accommodate for such fluctuations. The virtually continuous increase and decrease in conveyor speed presents numerous additional problems, including undue wear on the feeder components.

Those ordinarily skilled in the art will further appreciate that the downcomer on a gravimetric feeder traditionally includes a downstream discharge opening through which material is permitted to pass as it is moved along the path by the conveyor. In addition, the structure defining the discharge opening is designed to control the amount of material being transferred by the conveyor so as to facilitate relatively even and consistent volumetric transfer of material from the downcomer to the conveyor. This design, of course, assumes that sufficient material is being continuously deposited on the conveyor to cause the material that is moved out of the downcomer by the conveyor to be leveled off as it passes through the discharge opening. However, as will be set forth in further detail below, it has been determined that the traditional downcomer design simply does not permit the discharge opening to operate in the desired manner.

Another type of feeder that is susceptible to some of the aforementioned problems is a volumetric feeder. Such a feeder relies heavily on uniform and accurate volumetric flow and, contrary to a gravimetric feeder, includes no means for adjusting the belt speed in response to fluctuations in the volumetric flow rate.

OBJECTS AND SUMMARY OF THE INVENTION

Responsive to these and other problems, an important object of the present invention is to improve material flow through bulk feeders. In this respect, it is also an important object of the present invention to provide a bulk material feeder having uniform material flow from the downcomer to the conveyor. Another important object of the present invention to improve upon the construction of conventional volumetric and gravimetric feeder designs. Particularly, it is an object of the present invention to provide a feeder that does not suffer from undesirable conveyor speed fluctuations caused by uneven material flow.

In accordance with these and other objects evident from the following description of the preferred embodiments, the present invention concerns a bulk material feeder having a conveyor that is operable to convey material along a substantially horizontal path. Of course, if the principles of the present invention are being used on a gravimetric feeder, the conveyor speed may be adjustable responsive to the amount of material being carried by the conveyor. The feeder further includes a downcomer presenting a lower edge adjacent the conveyor, with the downcomer being configured to deliver the material onto the conveyor in an upright column. Moreover, the downcomer includes an innermost downwardly divergent surface which is believed to significantly improve material flow through the downcomer and onto the conveyor. The present invention also concerns a feeder inlet design that presents the divergent surface and is configured to be installed within an existing downcomer for improving material flow within the feeder without requiring extensive modification to the feeder. In addition, the present invention concerns the method of retrofitting an existing feeder with the inlet design.

Again, it has been determined that the divergent surface ensures that material flow is uniform from the downcomer to the conveyor. Particularly, it is believed that the divergent surface prevents the material from clogging within the downcomer as it flows downwardly toward the conveyor. It is also believed that the innermost divergent surface ensures that the discharge opening operates in its intended manner; that is, the structure defining the discharge opening serves to control the amount of material being moved away from the material column by the conveyor. As previously indicated, this leveling action facilitates uniform volumetrically efficient material transfer by the conveyor. In addition, it is believed that uniform material transfer by the conveyor is further facilitated by the fact that the divergent innermost surface provides essentially only lateral support to the material within the downcomer, such that virtually the entire material column confined by the divergent surface is supported on the conveyor. It is particularly believed that this relatively significant, downwardly directed pressure within the downcomer further decreases material flow fluctuations within the feeder and ensures that the material conveyed by the conveyor has uniform density.

Those ordinarily skilled in the art will appreciate that conventional bulk material feeders simply do not provide the advantages afforded by the present invention. It has been determined that this is primarily attributable to the traditional downcomer construction. Particularly, the downcomer wall is traditionally straight (i.e., generally parallel to the longitudinal axis of the downcomer), and it is believed that this straight-walled construction is not conducive to solid particulate material being fed to the conveyor by gravity and then through the discharge opening by the conveyor. It has further been determined that the material tends to bridge across the interior of the straight-walled downcomer and thereby create stoppages of material flow or, at the very least, uneven material flow. This phenomenon referred to herein as "bridging" is a result of the cohesive force of the material and the adhesive force between the material and the downcomer walls overcoming the gravitational influence on the material. Furthermore, it has been determined that material flow to the conveyor is typically uneven enough and insufficient in quantity to permit the discharge opening from operating in its intended manner. These problems become even more troublesome when dealing with a "sticky" material or material that becomes more cohesive as its moisture content increases (e.g., coal).

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a side elevational view of a gravimetric-type bulk material feeder having a divergent inlet constructed in accordance with the principles of the present invention, with portions of the feeder being broken away to reveal internal details of construction;

FIG. 2 is an enlarged, fragmentary side elevational view of the feeder shown in FIG. 1, particularly illustrating the inlet portion of the downcomer and its relationship to the conveyor;

FIG. 3 is a fragmentary vertical sectional view of the feeder taken along line 3—3 of FIG. 2; and FIG. 4 is a fragmentary side elevational view of an alternative embodiment of the present invention, wherein the innermost downwardly divergent surface of the downcomer is defined by the pipe wall.

DETAILED DESCRIPTION OF THE PREFERRED EMBODIMENTS

Turning first to the embodiment shown in FIGS. 1–3, the bulk material feeder 10 selected for illustration is provided along a material flow line that is vertical both upstream and downstream from the feeder 10. The illustrated feeder 10 comprises a traditional gravimetric feeder that serves to control the rate of material flow along the path, although it will be appreciated that the principles of the present invention are equally applicable to various other feeders. With the foregoing caveat in mind, it will be appreciated that the gravimetric feeder 10 includes a material supply downcomer 12 for connecting to the supply line 14 and a downwardly directed discharge spout 16 for connecting to the discharge line 18, in the usual manner. Except for the inventive features identified herein, it is entirely within the ambit of the present invention to variously construct both the downcomer 12 and the discharge spout 16. It is noted that the illustrated gravimetric feeder 10 is particularly well suited for use in a coal-fired power plant. In this respect, the supply line 14 traditionally extends upstream from the downcomer 12 immediately to a coal hopper (not shown), while the discharge line 18 will typically connect directly to a material processing station, such as a mill (also not shown) for pulverizing the coal into a fine highly, combustible powder.

In the usual manner, extending between the downcomer 12 and the discharge spout 18 is a variable speed conveyor 20 for conveying material therebetween. The illustrated conveyor 20 comprises an endless belt 22 that wraps around a pair of horizontally spaced pulleys 24 and 26, one or both of which may be powered to drive the belt 22. The belt 22 presents a substantially horizontal upper conveying stretch 22a (also referred to as an upper strand) that moves leftwardly, when viewing FIG. 1, to convey material from the downcomer 12 to the discharge spout 16, and a lower return stretch 22b (also referred to as a lower strand) that moves in the opposite direction. However, it will be appreciated that the principles of the present invention are equally applicable to various other conveyor designs. For example, it is entirely within the ambit of the present invention to provide a conveyor having a noncontinuous conveyor bed, with a plurality of beater bars being located below the bed to facilitate downstream movement of the material along the bed. It is also possible to provide a conveyor with a conveying stretch that slopes slightly downwardly toward the discharge end to promote movement of the material.

As perhaps best shown in FIG. 2, the illustrated conveyor 20 includes a series of support rollers 28, 30, 32, 34, 36, 38 located along the underside of the conveying stretch 22a generally below the downcomer 12. The support rollers 28–38 provide support to the belt 22 at the point where the weight of the material is greatest, as will subsequently be described. The rollers 28–38 are similarly constructed, and it therefore shall be sufficient to explain that the downstream roller 28 includes a central cylindrical bar 40 and a pair of stub shafts 42 and 44 projecting from opposite ends of the bar 40 (see FIG. 3). The shafts 42 and 44 are journaled for rotational movement on adjacent support walls 46 and 48 by respective bearing assemblies 50 and 52.

Downstream from the series of support rollers 28–38 are a pair of similarly constructed rollers 54 and 56 that are spaced along the length of the conveying stretch 22a to define a weigh span therebetween. In the usual manner, a weigh roller 58 is precisely centered along the weigh span and is shiftably supported by a pair of load cells 60 (only one of the load cells being shown in the drawing figures), with the load cells 60 generating an electric signal that is proportional to the weight of material supported on the weigh span. The load cells 60 are connected to the power mechanism (not shown) for the conveyor 20 so that driving power supplied to one or both of the pulleys 24 and 26 may be varied depending upon the weight of the material supported on the weight span. In this respect, the conveyor speed may be adjusted to control the amount of material being moved along the path.

In the illustrated embodiment, the conveyor 20 is contained within a housing 62 that is substantially cylindrical in shape to present a top surface 64, a bottom surface 66, a pair of side surfaces 68 and 70 extending between the top and bottom surfaces 64 and 66, and a pair of end surfaces 72 and 74 sealing off the opposite ends of the housing 62. Those ordinarily skilled in the art will appreciate that when the feeder 10 is used to convey combustible materials the housing 62 is traditionally constructed to standardized explosion pressure ratings. For example, the walls 64, 66, 68, 70, 72, 74 may be designed to withstand an internal housing pressure of up to one-hundred pounds per square inch. It is noted that each of the end surfaces 72 and 74 has an access opening (not shown) for providing access to the interior of the housing 62, with a pair of doors 76 and 78 being swingably supported on the respective end surfaces 72 and 74 for selectively covering the access openings.

The material deposited on the conveying stretch 22a by the downcomer 12 is moved toward the discharge pulley 24 and will ultimately drop off the discharge end of the conveyor 20. The material then falls by gravity into the discharge spout 16 and is thereby directed to the discharge line 18. It is noted that the discharge spout 16 has a hopper-type configuration for converting the material flow back into a stream that has a generally circular cross-sectional shape. That is to say, the discharge spout 16 causes the material falling from the conveyor 20 to converge downwardly into the cylindrical discharge line 18. Similar to the housing 62, the discharge spout 16 is preferably designed to withstand a predetermined internal pressure.

As noted above, except for the inventive features described below, the illustrated downcomer 12 is generally conventional in construction. Thus, it shall be sufficient to explain that the downcomer 12 includes an inlet valve 80 connected to the supply line 14 and a vertical pipe 82 extending downwardly from the valve 80 to the conveyor 20. The pipe 82 is cylindrical in shape and divided into three sections 82a, 82b, 82c, although the shape and sectioning of the pipe may vary as desired. The valve 80 and upper pipe section 82a are fastened to one another in the usual manner by flanges 84 and 86. The adjacent ends of the upper pipe section 82a and intermediate pipe section 82b are similarly interconnected by flanges 88 and 90. The lower pipe section 82c is preferably fixed to the top surface 64 of the housing 62, with the upper end of the lower pipe section 82c being spaced from the lower end of the intermediate pipe section 82b. An expansion joint 92 serves to interconnect these two sections of the pipe 82. In the usual manner, the expansion joint includes a pair of vertically spaced rings 94, 96, a sleeve 98 interposed in the space between the rings 94 and 96, a plurality of long nut and bolt assemblies 100 spaced circumferentially about the rings 94 and 96, and a gasket (not shown) located between the sleeve 98 and the pipe sections 82b and 82c (see FIG. 2). Thus, when the assemblies 100 are tightened, the expansion joint 92 securely seals around the adjacent ends of the intermediate and lower pipe sections 82b and 82c, yet permits limited relative movement therebetween.

As perhaps best shown in FIGS. 2 and 3, the lower pipe section 82c defines the lower edge 102 of the downcomer 12, with the edge 102 presenting a generally horizontal section 102a that is spaced just above the conveying stretch 22a and a downstream section 102b that is progressively spaced from the conveying stretch 22a in the downstream direction. The downstream section 102b consequently defines a discharge opening 104 through which material is permitted to pass laterally from the downcomer 12. As noted above, the downstream section 102b of the lower edge 102 is designed to limit or control the amount of material moved out of the downcomer 12 by the conveyor 20. In the illustrated embodiment, the downstream section 102b is defined along a plane that projects obliquely upward in the downstream direction relative to the conveying stretch 22a, such that the discharge opening has a so-called "ungular" shape, although the downstream section 102b may be variously arranged. It is also noted that the lower pipe section 82c includes an upstream panel 106 that projects upwardly from the lower edge 102 in an upstream direction. However, it is entirely within the ambit of the present invention to eliminate the upstream panel 106 so that the entire lower pipe section 82c has a circular cross-sectional shape, if desired.

It will be appreciated that the pipe sections 82a,82b,82c cooperatively present a casing wall that is substantially parallel to the longitudinal axis of the pipe 82. As previously indicated, it has been determined that this straight-walled construction causes problems with material flow through the feeder. If desired, the pipe sections and the expansion joint 92 may have an explosion resistant construction similar to the discharge spout 16 and housing 62.

In this respect, the illustrated downcomer 12 has been provided with a divergent inlet 108 that is believed to significantly improve material flow through the feeder 10. In the present embodiment, the inlet 108 comprises a tube 110 that is configured to fit lengthwise within the pipe 82. As perhaps best shown in FIG. 2, the tube 110 presents opposite wall sections 110a and 110b that diverge outwardly from a central throat 110c. With the inlet 108 installed in the downcomer 12, the upper wall section 110a converges downwardly toward the throat 110c, while the lower wall section 110b diverges downwardly toward the conveyor 20. The lower divergent wall section 110b is significantly longer than the upper convergent wall section 110a, and the lower divergent wall section 110b preferably has a length that is approximately at least two times greater than the diameter of the pipe 82. However, it is entirely within the ambit of the present invention to vary the length of either or both wall sections (e.g., the upper convergent wall section 110a could have the same length as the lower divergent wall section 110b).

In any case, it will be appreciated that the upper convergent wall section 110a serves to converge material flow within the downcomer 12 so that it may subsequently diverge as it moves toward the conveyor 20. Although it would be possible to provide a divergent inlet without the upper convergent wall section (e.g., an inlet having a radially inwardly extending flat wall that interconnects the inner surface of the pipe 82 and the throat of the inlet), such an arrangement is more likely to obstruct material flow. Thus, the inlet 108 preferably includes the upper convergent wall section 110a so that the risk of plugging at the throat 110c is reduced. It will be appreciated that the inlet 108 must have a section that is of reduced diameter relative to the straight-walled pipe 82, such as the throat 110c, because the divergent wall section 110b is located within the pipe 82. The upper convergent wall section 110a is preferably disposed at an angle between approximately thirteen and fourteen degrees relative to the pipe 82. This angle will be referred herein to as the angle of convergence, and is approximately 13.75 degrees in the illustrated embodiment (note, the illustrated pipe 82 has a diameter of approximately twenty-four inches). It has been determined that the illustrated convergent wall section 110a does not noticeably affect or impede material flow within the downcomer 12. However, other materials and even other coals may require a different angle of convergence. The angle of convergence may also need to be increased if the downward force of the material above 110a is insufficient to push the material through the restriction formed by central throat 110c. For most coals, the stated angle of convergence is sufficient.

The lower divergent wall section 110b of the inlet 108 projects generally from the lower end of the upper convergent wall section 110a such that the adjacent ends of the upper and lower sections 110a and 110b cooperatively define the throat 110c, although the throat may be lengthened to extend along the pipe 82 if desired. In any case, the divergent wall section 110b presents an innermost surface of the downcomer 12, along which the material flows as it moves downwardly toward the conveyor 20. The illustrated divergent wall section 110b preferably terminates at the uppermost boundary of the discharge opening 104 and projects upwardly therefrom generally to the top of the intermediate pipe section 82b. The divergent wall section 110b is preferably disposed at a one degree to two degrees angle relative to the straight wall of the pipe 82. This angle will be referred to herein as the angle of divergence, and the illustrated angle of divergence is 1.25 degrees. Although the angle of divergence may vary, it is important that the divergent wall section 110b extends sufficiently along the length of the pipe 82. Particularly, the angle of divergence must be large enough to prevent bridging of material within the wall section 110b but small enough to ensure that the material is delivered onto the conveyor 20 in the manner described hereinbelow.

It is believed that the lower divergent wall section 110b of the inlet 108 significantly improves material flow through the downcomer 12 and to the conveyor 20. That is to say, the inlet 108 has provided the unexpected result of virtually eliminating interruptions and/or fluctuations in material flow through the downcomer 12 and on the conveyor 20. It has been determined that this is primarily attributable to the fact that the divergent wall section 110b simply serves to confine the material in an upright column and provides virtually no other support thereto. In other words, the risk of bridging of the material across the interior of the divergent wall section 110b, which is believed to be caused by the cohesiveness of the material overcoming the influence of gravity, is significantly reduced. Therefore, the material confined within the wall section 110b is continuously presented to the conveyor 20. As perhaps best shown in FIG. 1, the divergent wall section 110b causes a material column M to be deposited directly onto the conveying stretch 22a above the series of support rollers 28–38. Because the divergent wall section 110b provides only lateral support to the material column M, the entire column exerts a pressure downwardly against the conveying stretch 22a. This downwardly directed pressure causes the material at the base of the column to be rather compacted and have a generally uniform density. Those ordinarily skilled in the art will appreciate that these conditions are often desirable when conveying solid particulate material. In addition, such conditions reduce variances in the amount of material being transferred by the conveyor 20, thereby further reducing the risk of undesirable conveyor speed fluctuations. It is also noted that the downstream section 102b of the lower edge 102 functions in the desired manner by limiting the amount of material transferred out of the downcomer 12 by the conveyor 20. As shown in FIG. 1, the lower edge 102 cooperates with the conveying stretch 22a to cause a generally steady, level stream of material to be moved along the flow path.

It is noted that the tube 110 preferably has a circular cross-sectional shape to conform to the shape of the pipe 82. In this respect, the shape of the tube 110 may be varied similar to the pipe 82, although it is preferred that the tube 110 and pipe 82 have generally the same shape. As perhaps best shown in FIG. 2, the wall thickness of the tube 110 is preferably less than the wall thickness of the pipe 82. It will be appreciated that the tube 110 need only be constructed to confine the material therein and be of sufficient thickness to account for wear, while the pipe 82 is preferably designed to certain explosion pressure ratings. That is to say, the tube 110 need not be designed to withstand high internal pressure, as the pipe 82 is already designed to accommodate for such situations. One suitable downcomer construction involves a tube 110 having a wall thickness of approximately 0.125 inch and a pipe having a wall thickness of approximately 0.375 inch. Of course, the wall thickness of the tube 110 may alternatively be greater than the pipe 82. For example, the upper convergent and lower divergent wall sections may have sufficient thickness to entirely consume the space between the inner surface of the pipe 82 and the inner surface of the tube 110. These alternative wall sections will consequently have odd shapes and will likely require such an alternative tube to be molded from a synthetic resin material.

In the illustrated embodiment, the inlet 108 includes a disk-shaped flange 112 that circumscribes the tube 110 and projects radially therefrom, although other suitable structure for mounting the tube 110 within the pipe 82 may be used. The illustrated flange 112 has a circular outermost boundary that corresponds with that of the flanges 88,90 of the adjacent pipe sections 82a, 82b (see FIG. 2). The inlet flange 112 includes a series of circumferentially spaced openings (not shown) for receiving the fasteners used to attach the pipe flanges 88 and 90 to one anther, whereby the inlet flange 112 is secured between the pipe flanges 88 and 90. In the preferred embodiment, the flange 112 projects outwardly from the throat 110c and is consequently located at the junction of the upper wall section 110a and lower wall section 110b, although the location of the flange 112 along the length of the tube 110 may be varied as necessary. In addition, the flange 112 may alternatively be welded to one or both of the pipe flanges 88, 90.

In this respect, it is possible to retrofit an existing downcomer with the inlet 108 simply by disassembling certain portions of the downcomer. For example, with respect to the illustrated downcomer 12, the valve 80 and the pipe sections 82a and 82b are removed from the supply line 14 and lower pipe section 82c and detached from one another. The lower divergent wall section 110b is then inserted through the upper end of the removed intermediate pipe section 82b until the inlet flange 112 engages the pipe flange 90. These components are then coupled to the lower pipe section 82c by inserting the lower end of the divergent wall section 110b into the lower pipe section 82c. The upper pipe section 82a is then slid over the exposed convergent wall section 110a, and the pipe flanges 88, 90 and inlet flange 112 may then be secured to one another. The inlet valve 80 is inserted between the supply line 14 and upper pipe section 82a so that the upper pipe section 82a, intermediate pipe section 82b, and inlet 108 are suspended from the valve 80. Finally, the expansion joint 92 is secured about the pipe sections 82b and 82c.

The operation of the feeder 10 shall be apparent from the foregoing description. Thus, it is sufficient to explain that bulk material is supplied by the line 14 to the downcomer 12. This material flows smoothly and evenly down through the downcomer 12 to the conveyor 20. Particularly, the material flow is first slightly converged by the upper section 110a of the inlet 108, although such convergence does not noticeably impede material flow. Thereafter, the material passes through the divergent wall section 110b, whereby bridging of the material across the interior of the downcomer 12 is prevented. The material is consequently confined in the upright column M which moves smoothly and uniformly to the lower open end of the pipe 82. The conveying stretch 22a of the conveyor 20 urges material at the lower end of the column M leftwardly (when viewing FIGS. 1 and 2), with the downstream section 102b of the lower edge 102 serving to limit material flow from the downcomer 12.

It is noted that the principles of the present invention are equally applicable to various other feeder constructions. Such an alternative is shown in FIG. 4, wherein the downcomer 200 is not provided with an inlet that serves to define the divergent innermost surface, but rather the pipe 202 is configured to define the divergent innermost surface. Similar to the embodiment shown in FIGS. 1–3, the pipe 202 includes an upper section 202a, an intermediate section 202b, and a lower section 202c fixed to the housing top surface 204. Although the upper pipe section 202a presents a pipe wall that is straight and parallel to the longitudinal axis of the pipe 202, the intermediate pipe section 202b and lower pipe section 202c cooperatively present a pipe wall that diverges downwardly. As indicated above, the angle of divergence presented by the pipe wall may vary, but is preferably 1.25 degrees. It will be appreciated that this design eliminates the need for a reduced diameter throat within the downcomer. The alternative feeder design includes a traditional support pan 206 below the downcomer 200, with the pan 206 serving the same purpose as the support rollers 28–38 shown in FIGS. 1–3. It is noted that the lower pipe section 202c may alternatively have a straight-walled construction, as long as the lower pipe section is relatively short (e.g., less than twelve inches) and is at least as large in cross-sectional shape as the intermediate pipe section 202b.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A bulk material feeder comprising:

a conveyor operable to transfer material along a substantially horizontal path; and a material supply downcomer having a lower edge adjacent the conveyor and being configured to deliver a generally upright column of the material onto the conveyor, said downcomer having an innermost downwardly divergent surface that terminates adjacent the lower edge, said lower edge of said downcomer including a downstream section spaced from the conveyor to define a discharge opening through which material from the column is permitted to pass as the material is conveyed along the path by the conveyor, and said downcomer including an outer casing wall and an inlet that is fit within the casing wall, said inlet including an inlet wall that defines the divergent surface, and said inlet wall including an upper downwardly convergent section, a lower downwardly divergent section that defines the divergent surface, and an interconnecting central throat section between the upper convergent section and the lower divergent section, wherein said lower downwardly divergent section is substantially longer than the upper downwardly convergent section.

2. A bulk material feeder as claimed in claim 1, said conveyor including an endless conveying belt having a substantially horizontal conveying stretch operable to move material along the path, said supply downcomer being configured to deliver the upright column of material onto the conveying stretch.

3. A bulk material feeder as claimed in claim 1, said downcomer having a circular cross-sectional shape, said downstream section of the lower edge extending along a plane that projects obliquely upward in a downstream direction relative to the path.

4. A bulk material feeder as claimed in claim 1, said casing wall being substantially circular in shape and defining the lower edge of the downcomer.

5. A bulk material feeder as claimed in claim 1, said inlet including a flange that projects outwardly from the inlet wall and is configured to be secured to the casing wall.

6. A gravimetric feeder for controlling the flow of a bulk material along a path, said feeder comprising:

a variable speed endless conveying element having a substantially horizontal conveying stretch operable to move material along the path; and a material supply downcomer configured to deliver a generally upright column of material onto the conveying stretch, said downcomer having a lower edge adjacent the conveying stretch, with the lower edge including a downstream section spaced from the conveying stretch to define a discharge opening through which material from the column is permitted to pass as the material is conveyed along the path by the conveying stretch, said downcomer further having an innermost downwardly divergent surface that terminates generally adjacent the discharge opening, said downcomer including an outer casing wall and an inlet that is fit within the casing wall, said inlet including an inlet wall that defines the divergent surface, said inlet wall including an upper downwardly convergent section, a lower downwardly divergent section that defines the divergent surface, and an interconnecting central throat section between the upper convergent section and the lower divergent section, wherein said lower downwardly divergent section is substantially longer than the upper downwardly convergent section.

7. A gravimetric feeder as claimed in claim 6, said downcomer having a circular cross-sectional shape, said downstream section of the lower edge extending along a plane that projects obliquely upward in a downstream direction relative to the conveying stretch.

8. A gravimetric feeder as claimed in claim 6, said downcomer including an inner upstream surface generally opposite from the discharge opening and extending between the divergent surface and the lower edge, said upstream surface projecting inwardly toward the discharge opening.

9. A gravimetric feeder as claimed in claim 6, said conveying stretch presenting a weigh span; and mechanism operable to sense the weight of the material supported on the weigh span so as to permit weight responsive adjustment of the speed of the conveying element.

10. A gravimetric feeder as claimed in claim 6, said casing wall being substantially circular in shape and defining the lower edge of the downcomer.

11. A gravimetric feeder as claimed in claim 6, said inlet including a flange that projects outwardly from the inlet wall and is configured to be secured to the casing wall.

\* \* \* \* \*